US008205752B2

(12) United States Patent
Sack et al.

(10) Patent No.: US 8,205,752 B2
(45) Date of Patent: Jun. 26, 2012

(54) CHILD-RESISTANT, SENIOR FRIENDLY PACKAGE HAVING A DEACTIVATABLE LOCKING MECHANISM

(75) Inventors: Ryen Sack, Hampshire, IL (US); Curtis A. Knutson, Loves Park, IL (US); Thomas Moyer, Freeport, IL (US)

(73) Assignee: Anderson Packaging, Inc., Rockford, IL (US)

( * ) Notice: Subject to any disclaimer, the term of this patent is extended or adjusted under 35 U.S.C. 154(b) by 0 days.

(21) Appl. No.: 13/020,297

(22) Filed: Feb. 3, 2011

(65) Prior Publication Data

US 2011/0186469 A1 Aug. 4, 2011

Related U.S. Application Data

(60) Provisional application No. 61/301,501, filed on Feb. 4, 2010.

(51) Int. Cl.
*B65D 83/04* (2006.01)
*A45C 13/10* (2006.01)
*A45C 13/18* (2006.01)

(52) U.S. Cl. ........................ 206/531; 206/1.5; 206/538

(58) Field of Classification Search .............. 206/1.5, 206/528, 531, 532, 538, 539
See application file for complete search history.

(56) References Cited

U.S. PATENT DOCUMENTS

| | | | |
|---|---|---|---|
| 4,192,422 A | 3/1980 | Kotyuk | |
| 7,581,642 B2 | 9/2009 | Knutson et al. | |
| 7,588,149 B2 | 9/2009 | Gelardi et al. | |
| 7,591,372 B2 | 9/2009 | Gelardi et al. | |
| 7,617,935 B2 | 11/2009 | Reilley et al. | |
| 7,793,784 B2 * | 9/2010 | Nivala | 206/531 |
| 7,806,270 B2 | 10/2010 | Seibert et al. | |
| 7,900,772 B2 * | 3/2011 | Sack et al. | 206/531 |
| 8,066,121 B2 * | 11/2011 | Sack et al. | 206/531 |
| 2004/0045858 A1 | 3/2004 | Harrold | |
| 2008/0251410 A1 | 10/2008 | Gelardi | |
| 2008/0283434 A1 | 11/2008 | Gelardi | |
| 2009/0045078 A1 | 2/2009 | Gelardi et al. | |
| 2009/0184022 A1 * | 7/2009 | Coe et al. | 206/531 |
| 2010/0300923 A1 | 12/2010 | Sack et al. | |

* cited by examiner

*Primary Examiner* — Bryon Gehman
(74) *Attorney, Agent, or Firm* — Howson & Howson LLP

(57) ABSTRACT

A package for storing and dispensing tablets includes a blister card having blister compartments and a hollow plastic sleeve providing a protective housing for the blister card when the blister card is in a storage position within the sleeve. The sleeve includes a pair of latches that extend toward the blister card, and the blister card includes a pair of latch-catchers for cooperatively engaging and catching the latches when the blister card is in a storage position to automatically lock the blister card in the storage position within the sleeve when the blister card is slid to the storage position. The sleeve also includes a deactivator positionable between a first position in which the blister card is permitted to automatically lock to the sleeve when the blister card is slid to the storage position and a second position for preventing the blister card from becoming locked to the sleeve.

15 Claims, 5 Drawing Sheets

CHILD-RESISTANT, SENIOR FRIENDLY PACKAGE HAVING A DEACTIVATABLE LOCKING MECHANISM

CROSS-REFERENCE TO RELATED APPLICATION

This application claims the benefit under 35 USC §119(e) of U.S. Provisional Patent Application No. 61/301,501, filed Feb. 4, 2010.

BACKGROUND OF THE INVENTION

The present invention relates to a container or packaging for a plurality of relatively-small separate items, such as tablets, doses of medicine, or the like, and more particularly, the present invention relates to a compact package including a hollow protective outer sleeve or case housing one or more separate blister cards or the like and providing child-resistant, senior-friendly dispensing properties.

U.S. Pat. No. 7,581,642 B2 issued to Knutson et al., 7,617,935 B2 issued to Reilley et al. and 7,806,270 B2 issued to Seibert et al. and U.S. Patent Application Publication No. 2010/0300923 A1 of Sack et al. are assigned to Anderson Packaging, Inc., the assignee of the present application, and disclose examples of packages including a molded plastic sleeve or case and a blister card combination that provides child-resistant, senior-friendly dispensing properties. Further examples of packages are disclosed by U.S. Pat. No. 7,591,372 B2 issued to Gelardi et al. and 7,588,149 B2 of Gelardi and U.S. Patent Application Publication Nos. 2009/0045078 A1 of Gelardi et al. and 2008/0251410 A1 and 2008/0283434 A1 of Gelardi.

Although the packages disclosed by the above reference patents and published applications are suitable for their intended purposes, there is a need for alternate designs of such packages that are of novel construction and that are difficult for a young child to open (i.e. receive a so-called "F=1" child resistant rating), yet can readily be opened and closed by an intended end-user, such as a senior citizen. Preferably, the package includes a molded plastic container body, case or sleeve for storing a blister card, tray or the like on which numerous items, such as tablets, doses of medicine, or the like, are individually secured in blister compartments. The blister card should be able to be slid between a retracted position in which the items are protected and housed within the package and a dispensing position in which the blister card at least partially extends in an exposed condition from the package.

SUMMARY OF THE INVENTION

The present invention provides a package having child-resistant, senior-friendly dispensing properties for storing and dispensing tablets or like items. The package includes a blister card having a substantially flat card section and a plurality of blister compartments for holding the tablets or like items and a hollow plastic sleeve having an opposed pair of major wall panels, an opposed pair of side edges and a dispensing end. The sleeve provides a protective housing for the blister card when the blister card is in a storage position within the sleeve. The blister card is slidable in an end-to-end direction relative to the sleeve between the storage position and a dispensing position in which the card section extends at least partially outside the sleeve to expose the blister compartments. The sleeve includes a pair of latches that extend from at least one of the wall panels toward the blister card, and the blister card includes a pair of latch-catchers for cooperatively engaging and catching the latches when the blister card is in a storage position to automatically lock the blister card in the storage position within the sleeve when the blister card is slid to the storage position. The opposed pair of side edges of the sleeve include a pair of opposed resiliently-depressible tabs for unlatching the latches from the latch-catchers when the pair of opposed tabs are simultaneously depressed toward one another to permit the blister card to slide relative to the sleeve from the storage position to the dispensing position. The sleeve also includes a deactivator positionable between a first position in which the blister card is permitted to automatically lock to the sleeve when the blister card is slid to the storage position and a second position for preventing the blister card from becoming locked to the sleeve.

BRIEF DESCRIPTION OF THE DRAWINGS

The present invention should become apparent from the following description when taken in conjunction with the accompanying drawings, in which.

DETAILED DESCRIPTION OF THE INVENTION

Figure 1:
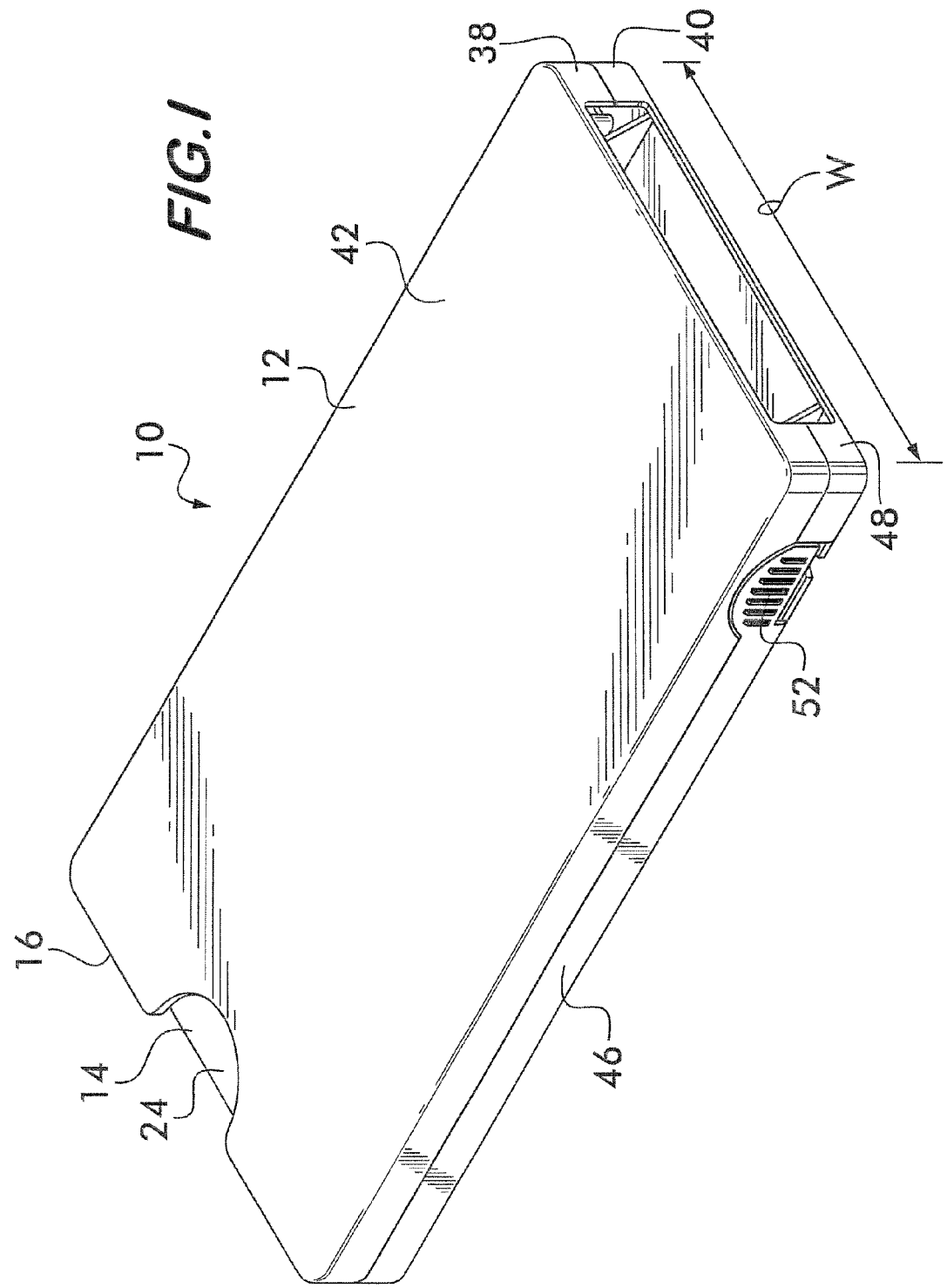
FIG. 1 is perspective view of a package including a sleeve with a blister card retained in a storage position according to the present invention.

The present invention is directed to the structure of a package comprising one or more blister cards contained within a protective plastic hollow sleeve or case. The present invention is similar in some aspects to the package disclosed in U.S. Patent Application Publication No, 2010/0300923 A1, the disclosure of which is hereby incorporated herein by reference. Various embodiments are disclosed herein and various alterations can be made to the embodiments within the scope of the present invention.

A relatively compact package 10 is illustrated in FIGS. 1-6 and includes a hollow protective sleeve or case 12 housing a single blister card 14 which is capable of sliding into and out of the sleeve 12. The purpose of the sleeve 12 is to form a protective compact case for housing the blister card 14. The blister card 14 can be slid relative to the sleeve 12 in an end-to-end direction through a dispensing end 16 of the sleeve 12 to a dispensing position and can be slid into the sleeve 12 to a storage position. In the storage position, the blister card 14 is held in a substantially stationary position relative to the sleeve 12 and very little movement of the blister card 14 relative to the compact sleeve 12 is permitted. As an alternative, the package could be designed to hold two separate cards that can each be slid out an opposite end of the package. For instance, see the disclosure of such a package in U.S. Patent Application Publication No. 2010/0300923 A1.

The package 10 includes a locking mechanism such that the blister card 14 automatically becomes locked in the storage position when it is fully inserted within the sleeve 12, and thereafter, a user is required to perform multiple simultaneous actions to free the blister card 14 from the storage position to enable the blister card 14 to slide relative to the sleeve 12 to the dispensing position. The above referenced multiple simultaneous actions are of a type not readily accomplished by a young child but that can readily be performed by intended users, such as adults.

In addition to the locking mechanism, the package 10 according to the present invention also includes a mechanism for deactivating or disabling the locking mechanism of the package. When the locking mechanism is deactivated or disabled, the blister card 14 is free to slide into and out of the sleeve 12, and the above referenced multiple simultaneous actions are not required to enable the card to be slid from the storage position to the dispensing position. Thus, if the child-resistant property of the package is not desired, it can be deactivated enabling easier access to the contents of the package 10.

Accordingly, the blister care 14 can be slid into the sleeve 12 to the storage position from the dispensing position by being pushed into the sleeve 12. Unless the locking mechanism is deactivated as discussed above, the blister card 14 automatically becomes locked in the storage position and thereafter cannot be slid to the dispensing position until the above referenced multiple simultaneous actions are again performed. The above described operations permit the package 10 to have child-resistant properties sufficient for a so-called F=1 child resistant rating, yet still is able to be readily opened by an intended user during the entire life of the package 10. As one example, the package 10 can be adapted for use as a unit dose package.

The Blister Card

Turning first to the structure of the blister card 14, it can have a thin sheet-like card section 18 with a plurality of separately-accessible, hollow, blister compartments 20 or the like projecting from a face thereof. By way of example, the blister card 14 can be made of a thermoform-able plastic tray having a plurality of separate, spaced-apart, upstanding blister compartments 20 and can have a foil backing forming an underside of the blister card 14 for sealing pills, tablets or like items within the blister compartments 20. To dispense an item from the blister card 14, downward-directed pressure is applied to a selected one of the blister compartments 20 to cause the stored item to break through the foil backing and be released from the blister card 14.

The card section 18 of the blister card 14 can be generally rectangular in plan view of a predetermined length and width. Of course, the card section 18 can be of other shapes in plan view. The blister compartments 20 project a predetermined height from a face of the card section 18. The card section 18 includes a front margin 22 adjacent a leading front edge 24 of the blister card 14, a rear margin 26 adjacent a distal end 28 of the blister card 14, and a pair of side margins 30 extending lengthwise along the opposite sides of the blister card 14.

A further structural feature of the blister card 14 is the presence of a pair of latch catchers, or locking cavities, 32 with one being provided in each corner, 34 and 36, of the distal end 28 of the blister card 14. Each locking cavity 32 extends within the rear margin 26 and one of the side margins 30 of the card section 18 of the blister card 14. See FIG. 4. In the illustrated embodiment, the locking cavities 32 are shown as apertures; however, they can also be provided as slots, notches, depressions, receptacles, bent edges, upstanding formations, or like elements capable of providing an opening with a free edge for receiving and catching a latch. Simply for purposes of example, an extra blister compartment can be formed on the distal end of the blister card and provide the necessary latch-catching structure or a part of the blister card can be bent or otherwise formed to provide the latch-catching structure. Further, a separately-manufactured element can be added onto and secured to the distal end of the blister card to provide a latch-catching structure.

As will be explained in greater detail, the latch-catching locking cavities, 32, can be used to serve a dual function of forming both a part of the locking mechanism used to lock the blister card 14 in the storage position within the sleeve 12 and a part of a retaining mechanism used to prevent full separation of the blister card 14 from the sleeve 12 in the fully-extending dispensing position. Alternatively, the locking cavities 32 can provide only one of the above referenced functions with a different structural element of the blister card providing the other unction. For example, the locking cavities 32 can provide part of the locking mechanism and some other structural feature of the card 14 can provide part of the retaining mechanism.

The Protective Hollow Sleeve

According to one contemplated embodiment, the hollow sleeve 12 can be assembled from a pair of separately molded plastic body sections, 38 and 40, that when joined together form the sleeve 12. These body sections will arbitrarily be referred to herein as the top or upper body section 38 and the bottom or lower body section 40, although there may not be an actual predefined top or bottom. By way of example, the body sections 38 and 40 can be made of plastic, such as polypropylene or like thermoplastic material, and can be formed, for instance, by injection molding or like plastic molding technique.

Figure 2:
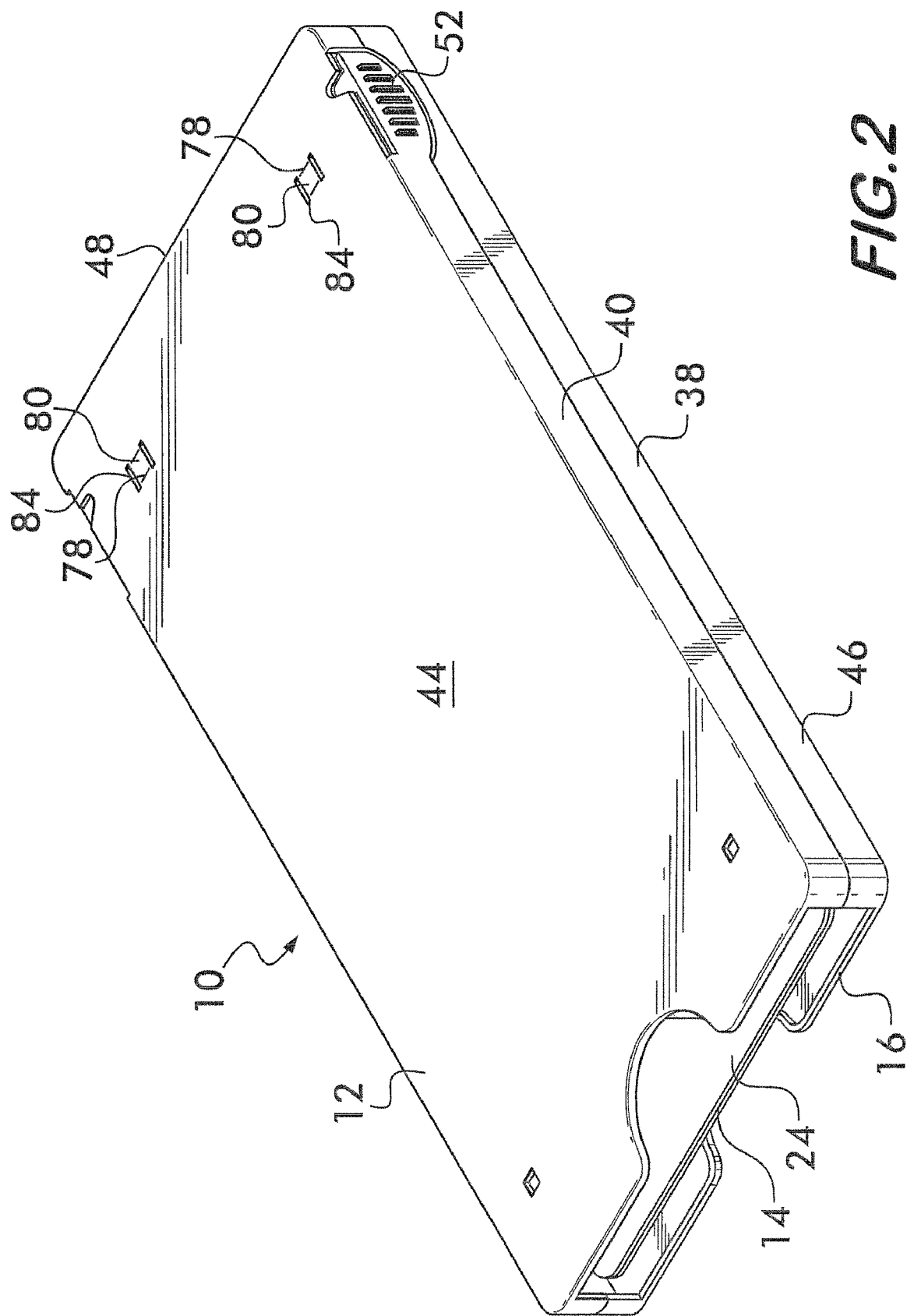
FIG. 2 is a perspective view of the underside of the package of FIG. 1.

As best illustrated in FIGS. 1 and 2, the body sections, 38 and 40, when assembled to form the sleeve 12 provide opposite major wall panels, 42 and 44, opposite side edges 46 that interconnect wall panels 42 and 44, a dispensing end 16, and an opposite end 48. The compact sleeve 12 can be flat and generally rectangular as illustrated, and the major wall panels, 42 and 44, can extend substantially parallel to the card section 18 of the blister card 14 and be of dimensions that are only slightly greater than the length and width of the blister card 14. Of course, other wall shapes can also be used provided that the walls can function as a protective case for the blister card 14 when the blister card 14 is in the storage position.

The dispensing end 16 of the sleeve 12 defines a slot-shaped dispensing opening through which the blister card 14 can be slid between retracted (storage) and extended (dispensing) positions relative to the sleeve 12. The side edges 46 can essentially define a height, or thickness, of the slot-shaped opening of the dispensing end 16 of sleeve 12. As best illustrated in FIGS. 1-2, only a small portion of the leading front edge 24 of the blister card 14 is exposed when the card 14 is in the storage position. This exposed portion of the front edge 24 can be gripped by a user to slide the card 14 to the dispensing position when the locking mechanism is unlocked or deactivated.

The slot-shaped opening of the dispensing end 16 of the sleeve 12 is sufficiently large only to permit the blister card 14 to slide in an end-to-end direction through the dispensing end 16 parallel to a longitudinal axis of the card section 18 and wall panels 42 and 44. Thus, the dispensing end 16 only reveals an end profile of the blister card 14 housed within the container body 12 as viewed when looking into an end of the sleeve 12.

The opposite end 48 of the sleeve 12 can also have an open end design and need not be entirely closed. Thus, both the dispensing end 18 and the end opposite 48 can be open ends permitting visualization of the end profile of the blister card 14 contained within the sleeve 12. An internal transversely-extending stop 50 can be formed on the bottom body section 40 to engage the blister compartments 20 or other structure on the card 14 and prevent the card from passing through end 48 of the sleeve 12. Alternatively, in some contemplated embodiments, the card 14 may be slid-able through both ends, 16 and 48, or one card can slide through one end with a second separate card sliding through the opposite end.

As discussed above, the blister card 14 is prevented from sliding relative to the sleeve 12 when in the locked storage position. Accordingly, gripping and pulling the exposed leading edge 24 of the blister card 14 by itself does not enable the blister card 14 to be passed through the dispensing end 16 of the sleeve 12 when the locking mechanism is enabled. Rather, the blister card 14 must be pulled simultaneously while a pair of opposed tabs 52 located on side edges 46 of the sleeve 12 are simultaneously pressed inward, such as between the thumb and finger of one hand of the user. This dual action unlocks the blister card 14 from the sleeve 12 and permits the blister card 14 to slide relative to the sleeve 12 through the dispensing end 16 of the sleeve 12 to a dispensing position.

As an added degree of child-resistance, the width "W" of the sleeve 12 defines the amount of spacing between the opposed tabs 52. Preferably, the width "W" is selected such that the spacing is sufficiently large to make it difficult for a young child having a small hand to be able to simultaneously depress both tabs 52 with a single hand.

Figure 3:
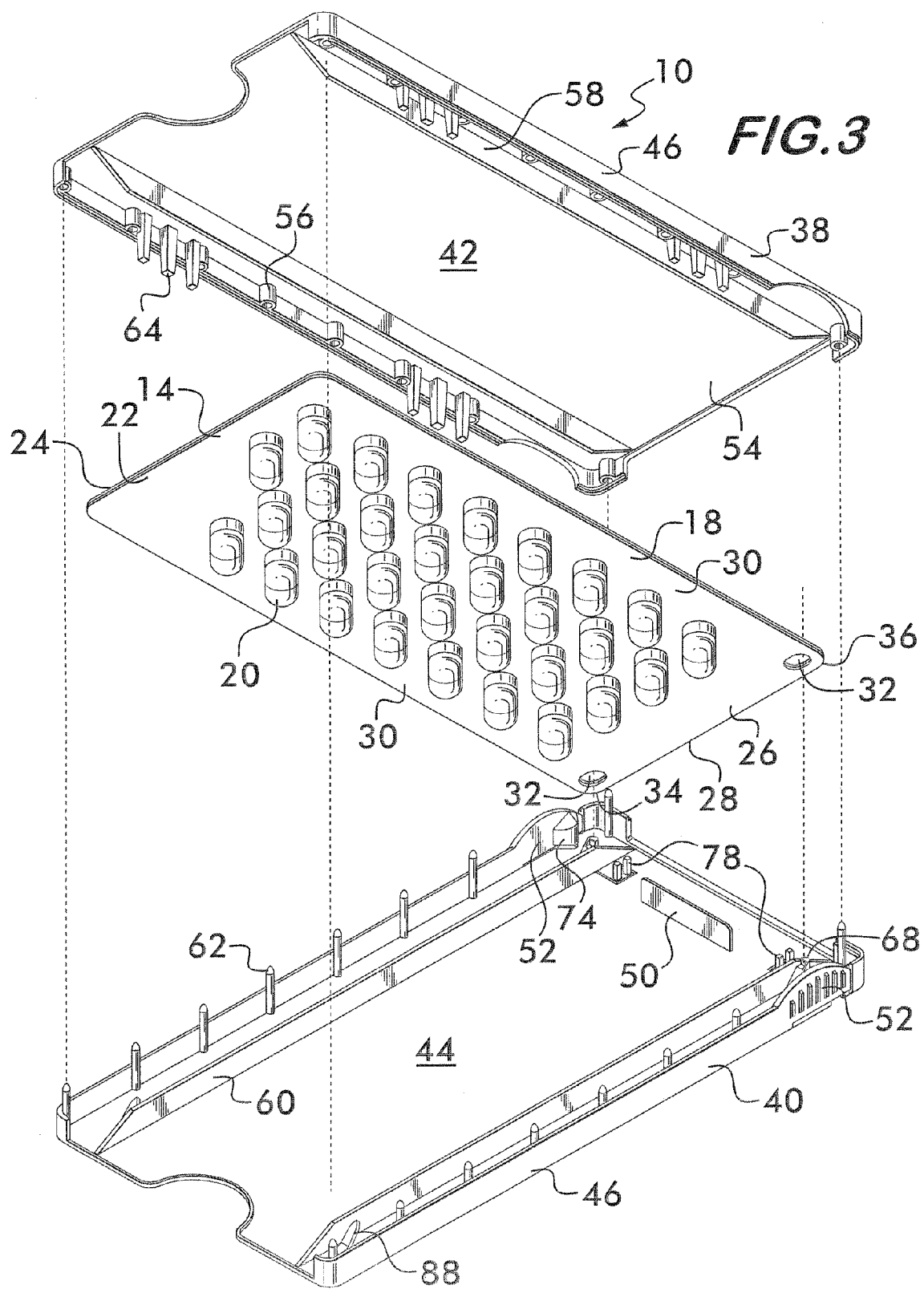
FIG. 3 is an exploded perspective view of the package of FIG. 1 showing the respective alignment of the opposed body sections of the sleeve and the blister card therebetween.
Figure 4:
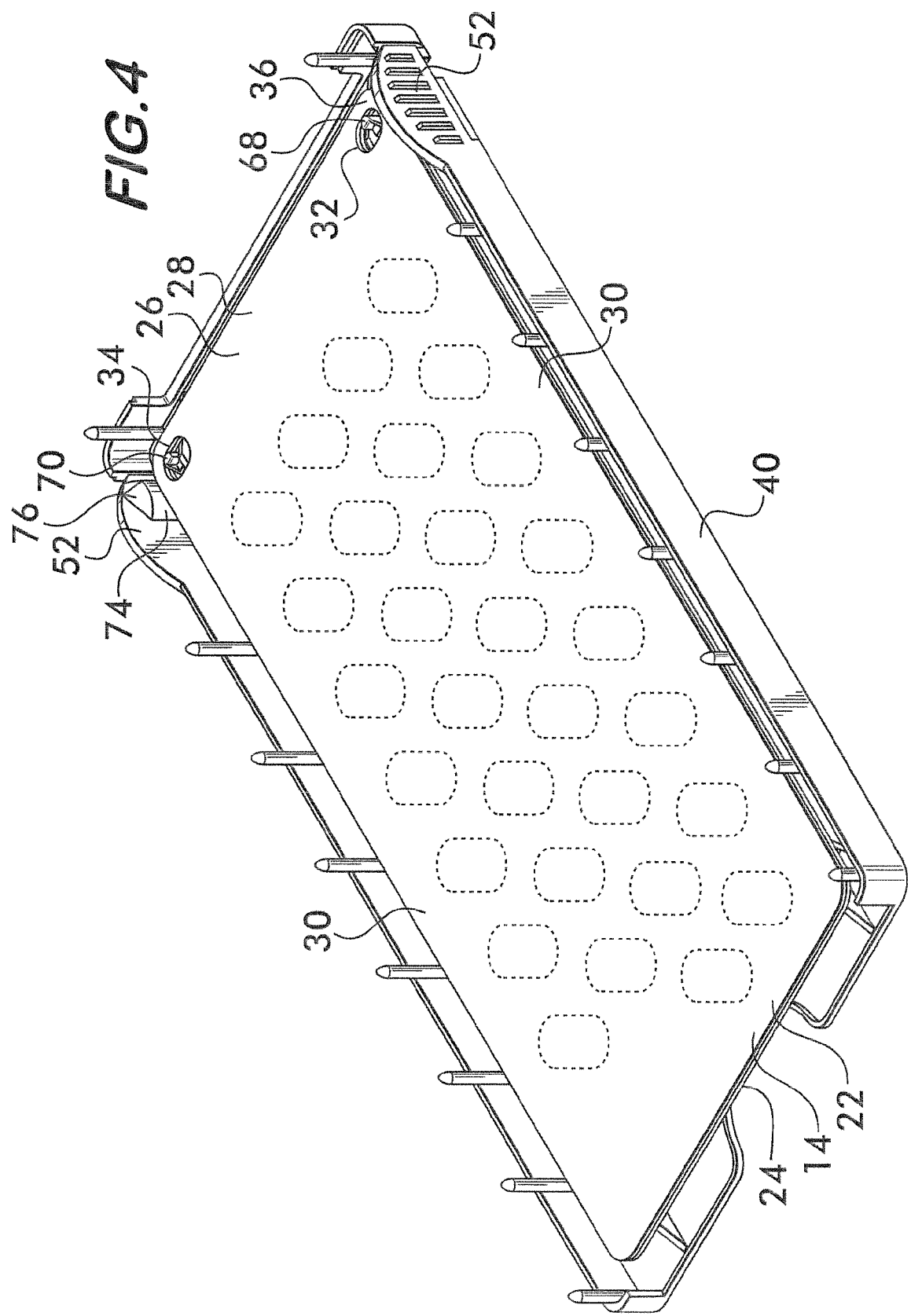
FIG. 4 is a perspective view of the blister card positioned within the lower body section of FIG. 3 before the upper body section is assembly thereto.

As discussed above, the sleeve 12 can be formed by a pair of body sections, 38 and 40. The top body section 38 (as shown in FIG. 3) can be generally provided as a substantially flat panel with an underside 54 having a plurality of sockets 56 for receiving opposed securement posts 62, and a pair of support rails 58 for supporting and engaging the underside (i.e., foil backing side) of the card section 18 along the side margins 30 of the blister card 14. In contrast, the bottom body section 40 (as shown in FIG. 3) includes the side edges 46, tabs 52, a pair of support rails 60 for supporting and engaging the upper face (i.e., face of card from which the blister compartments project) of the card section 18 along the side margins 30 of the blister card 14, and a plurality of securement posts 62. Additional bracing 64 can be provided on the body section 38 to structurally strengthen the connection between the top and bottom body sections, 38 and 40, and to prevent them from being pulled apart by force generated by a young child. The showing of posts, bracing and sockets as shown in FIG. 3 can be reversed on the body sections, as desired.

When body sections 38 and 40 are joined together to form the sleeve 12, a small gap is provided between each opposing set of support rails, 58 and 60. The gaps are sufficient to receive the thickness of the card section 18 of the blister card 14 therebetween and to permit the blister card 14 to slide relative to the sleeve 12 in a stable manner. Other movement of the card section 18 outside an imaginary plane extending through the gaps is essentially prevented. The support rails 58 and 60 are positioned such that they engage the side margins 30 of the card section 18 and such that all blister compartments 20 carrying items to be dispensed are located between the two sets of support rails.

The Locking Mechanism

The latches, levers, posts, flanges, tabs, stops or like structures used to lock the blister card 14 in the storage position are provided as molded elements extending from the bottom body section 40. For example, as best shown in FIGS. 3-6, a latch 68 extends adjacent each tab 52. The latch 68 can be provided as a tapered post, tab or flange type structure extending from the major wall panel 44 and have an upper locking tip 70 which extends to a height greater than that of the adjacent support rail 60. Accordingly, when the blister card 14 is slid to the storage position, the front taper 72 of the latch 68 engages the corner of the distal end 28 of the card section 18 of the blister card 14 and directs it up over the locking tip 70 of the latch 68. The locking cavity 32 of the blister card 14 ultimately registers with the latch 68 and the corner of the card section 18 resiliently returns to its planar, non-deflected configuration. See FIGS. 4 and 5. In this condition, the locking cavity 32 receives and captures the locking tip 70 of the latch 68 and prevents the blister card 14 from being slid relative to the sleeve 12.

Figure 5:
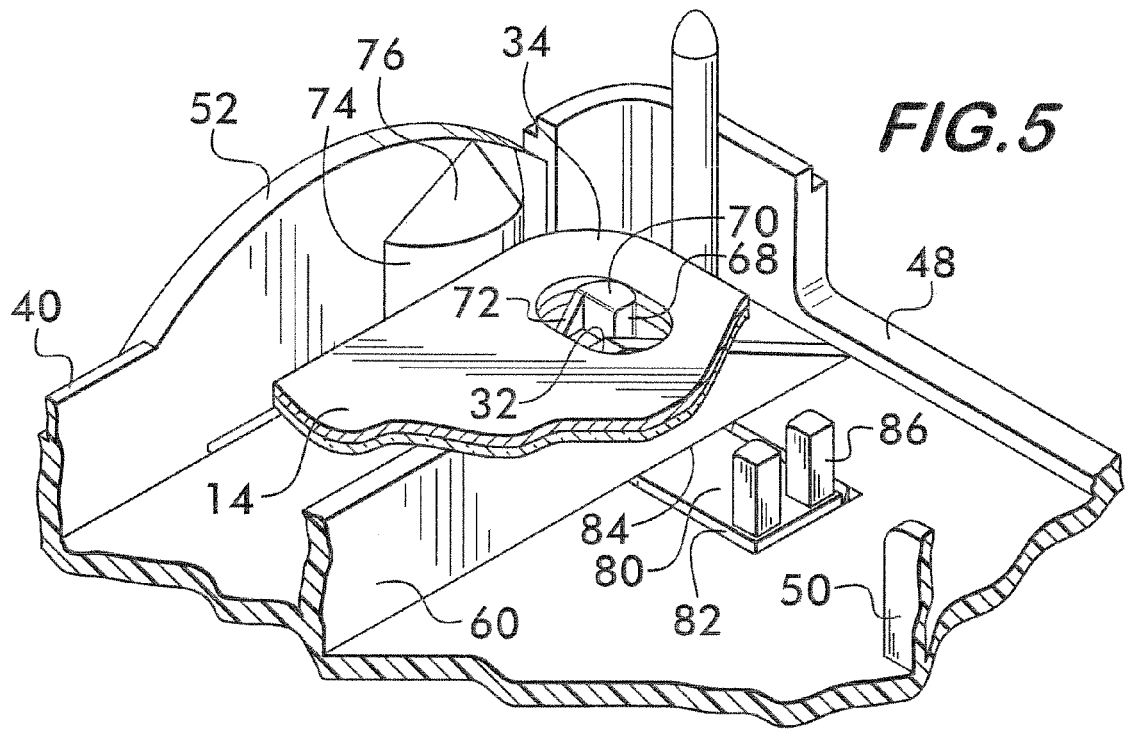
FIG. 5 is an enlarged perspective view of one of the locking mechanisms shown in FIG. 4 with a portion of the blister card broken away to show a lock deactivating mechanism in a normal, non-use condition.
Figure 6:
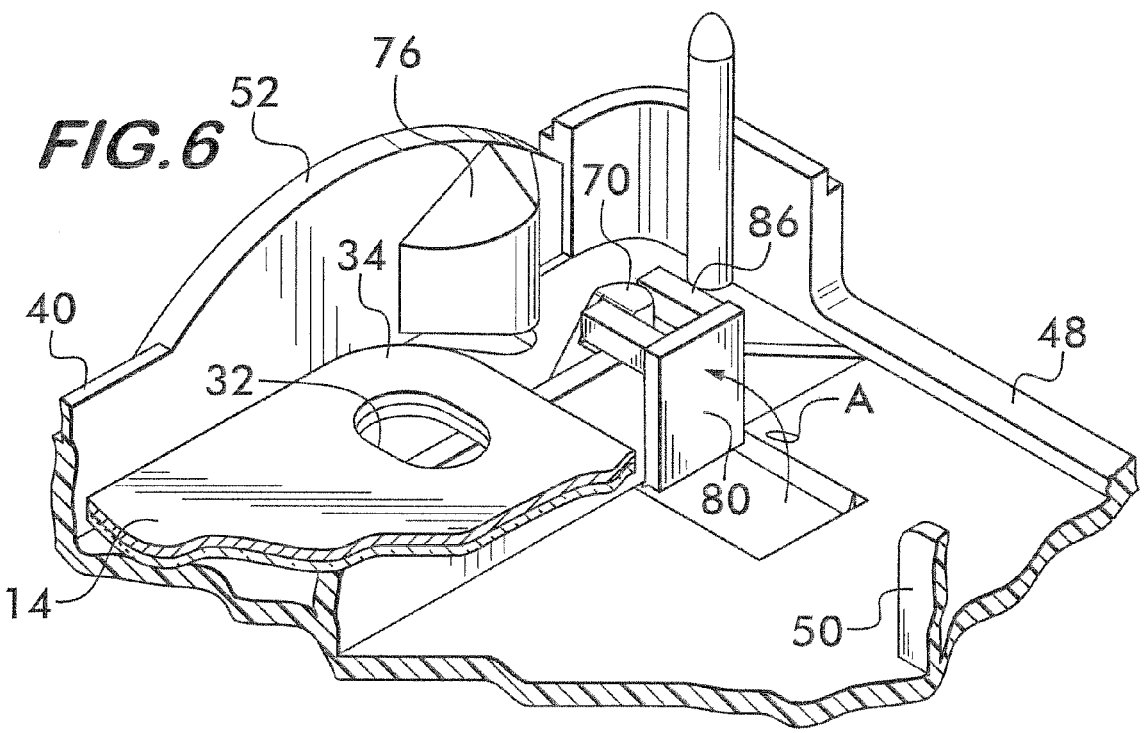
FIG. 6 is an enlarged perspective view similar to FIG. 5 except that the lock deactivating mechanism is shown in an extended condition thereby disabling the locking mechanism of the package.

For purposes of releasing the latch 68 from the locking cavity 32, the tab 52 has an inwardly-directed lifting arm 74 extending transversely within the sleeve 12 and transverse to the longitudinal axis of the card 14. As best illustrated in FIGS. 5 and 6, the lifting arm 74 is tapered providing a ramp 76. Thus, when the tab 52 is pressed inward by a user, the arm 74 engages underneath the card section 18 of the blister card 14 and flexes/lifts the corner of the distal end 28 of the card section 18 above and over the locking tip 70 of the latch 68. In this condition, the blister card 14 is no longer prevented from sliding relative to the latches 68 provided that both tabs 52 are pressed in simultaneously to lift both corners, 34 and 36, of the distal end 28 of the card 14 off both latches 68. The tabs 52 resiliently return to their original positions as shown in FIGS. 5 and 6 after finger pressure is released from tabs 52 so that the tabs 52 do not interfere with the card 14 being locked to the latches 68 the next time the card 14 is slid to the storage position.

The Lock Deactivating Mechanism

There may be occasions when the above referenced locking feature is not desired. Accordingly, the package 10 of the present invention includes a mechanism for deactivating or disabling the locking mechanism provided by the engagement of the latches 68 with the latch catchers 32. More specifically, the deactivating mechanism can be used to prevent the latch catchers 32 from registering with the latches 68 and/or to effectively enlarge the size of the latches 68 such that, even if the latch catchers 32 register with the latches 68, the size of the latches 68 is too large to be received within the latch catchers 32. In either event, no locking engagement occurs between the card 14 and the sleeve 12 and the card 14 is free to slide relative to the sleeve 12.

The bottom body section 40 can have at least one deactivator 78 that is molded integrally therewith. Preferably, the bottom body section 40 includes a pair of deactivators, one for each latch 68. Alternatively, only one deactivator 78 could be provided on the package 10. As best illustrated in FIG. 5, each deactivator 78 is formed as a small panel 80 forming part of the major wall panel 44 of the sleeve 12 (see FIG. 2) and is located adjacent one of the latches 68 on an opposite side of the rail 60 relative to the adjacent latch 68.

Preferably, all but one side of deactivator panel 78 are connected to the surrounding major wall panel 44 by frangible, breakable score-lines or sections 82. In the position shown in FIG. 5 when the frangible sections 82 are unbroken, the deactivator panel 78 does not interfere with the operation of the locking mechanism and latch 68. In this position, the deactivator wall panel 80 extends parallel to the surrounding portions of the major wall panel 44 and forms a part of the major wall panel 44.

However, when the frangible sections 82 are broken, the deactivator wall panel 80 can be bent or pivoted (see arrow "A" in FIG. 6) about a hinge 84 such that it extends transverse or substantially perpendicular relative to the major wall panel 44. See FIG. 6. In this position, the panel 80 is positioned against the rail 60 and extends to a height beyond that of the adjacent latch 68. Thus, as best shown in FIG. 6, when the card 14 is slid toward the storage position, its distal end 28 contacts the leading edge of the deactivator wall panel 80 and is prevented from extending over the latch 68 and/or is prevented from receiving the latch 68 within the latch catcher 32 thereby disabling the locking feature of the package 10. To the extent the card 14 extends over the deactivator panel 80 shown in FIG. 6, the size of the combined deactivator 78 and latch 68 is such that it will not fit within the latch catcher 32. Thus, the card 14 would ride on top of the deactivator 78 and latch 68 and would not be locked to the latch 68.

As best illustrated in FIGS. 5 and 6, the deactivator 78 can include a pair of engagement fingers 86 that engage about the latch 68 when the deactivator wall panel 80 is pivoted to the position shown in FIG. 6. These fingers 86 frictionally engage and positively grip the latch 68 and prevent the deactivator wall panel 80 from unwanted pivoting relative to the latch 68. Thus, after the locking feature is deactivated, it stays deactivated.

The Retaining Mechanism

When the blister card 14 is in the dispensing position relative to the sleeve 12, access is readily permitted to at least some of the items carried by the blister card 14. Preferably, the blister card 14 only partially extends through the dispensing end 18 of the sleeve 12 in the dispensing position and is not fully separated from the sleeve 12. Rather, in a fully-extended dispensing position, the distal end 28 of the blister card 14 remains captured within the sleeve 12 to tether the blister card 14 to the sleeve 12.

For example, a retaining tab 88 or the like can be located near the dispensing end 16 of the sleeve 12 and can be in the form of a flange, post, lever or the like. When the blister card 14 is slid to the fully-extended dispensing position, the locking cavity 32 or some other structure of the card 14 registers or engages with the retaining tab 88. Accordingly, the distal end 28 of the blister card 14 is prevented from releasing through the dispensing end 16 of the sleeve 12. This provides only one example of a structure for tethering the card 14 to the sleeve 12. Other structures can be utilized. Also, in some embodiments, the card 14 may not need to be tethered to the sleeve 12 in the dispensing position.

The above referenced package 10 is preferably produced utilizing automated, high-speed equipment enabling commercial-sized quantities of the packages 10 to be formed, assembled, and loaded with blister cards 14 in a cost efficient manner within a relatively short period of time. The packages 10 of the present invention meet and surpass the standards (F=1) required for a child proof package yet are easy to open and close by adults including senior citizens. Further, the packages 10 are made of materials that can be readily recycled thereby providing a package that is both environmentally-friendly and inexpensive to manufacture. Still further, the sleeves are capable of being made from recycled materials.

While numerous packages have been described in detail, various modifications, alterations, and changes may be made without departing from the spirit and scope of the package according to the present invention as defined in the appended claims.

We claim:

1. A package having child-resistant, senior-friendly dispensing properties for storing and dispensing tablets, comprising:
   a blister card having a substantially flat card section and a plurality of blister compartments for holding the tablets; and
   a hollow plastic sleeve having an opposed pair of major wall panels, an opposed pair of side edges and a dispensing end;
   said sleeve providing a protective housing for said blister card when said blister card is in a storage position within said sleeve, and said blister card being slidable in a direction relative to said dispensing end of said sleeve between said storage position and a dispensing position in which said card section extends at least partially outside said sleeve to expose said blister compartments;
   said sleeve including a pair of latches that extend from at least one of said wall panels toward said blister card;
   said blister card including a pair of latch-catchers for cooperatively engaging and catching said latches when said blister card is in said storage position to automatically lock said blister card in said storage position within said sleeve when said blister card is slid to said storage position;
   said opposed pair of side edges of said sleeve including a pair of opposed resiliently-depressible tabs for unlatching said latches from said latch-catchers when said pair of opposed tabs are simultaneously depressed toward one another to permit said blister card to slide relative to said sleeve from said storage position to said dispensing position;
   each of said tabs having an arm with a tapered surface extending transversely within said sleeve, wherein, when each of said tabs is depressed, each of said tapered surfaces of said arms engages and flexes said card section of the said blister card such that an adjacent one of said latches is released from an adjacent one of said latch-catchers; and
   said sleeve including a deactivator positionable between a first position in which said blister card is permitted to automatically lock to said sleeve when said blister card is slid to said storage position and a second position for preventing said blister card from becoming locked to said sleeve, said deactivator including a wall panel forming a part of one of said major wall panels of said sleeve when said deactivator is in said first position, and said wall panel of said deactivator having one edge forming a hinge about which said wall panel of said deactivator is pivotal from said first position to said second position.

2. A package according to claim 1, wherein, in said second position, said wall panel of said deactivator extends substantially perpendicular to said major wall panel to which it is connected adjacent one of said latches to a height extending above a height of said adjacent one of said latches.

3. A package according to claim 2, wherein said wall panel of said deactivator includes a pair of fingers which extend about said adjacent one of said latches capturing said adjacent one of said latches therebetween and forming a frictional engagement with said adjacent one of said latches to retain said deactivator in said second position.

4. A package according to claim 3, wherein a support rail for supporting sliding movement of said blister card extends from said major wall panel of said sleeve on which said wall panel of said deactivator is formed such that said support rail extends between said wall panel of said deactivator and said adjacent one of said latches.

5. A package according to claim 4, wherein each of said latch-catchers is an aperture formed in said blister card, and wherein, when said deactivator is in said second position in frictional engagement with said adjacent one of said latches, a combination of said deactivator and said adjacent one of said latches is sufficiently large such that it cannot fit within said aperture.

6. A package according to claim 4, wherein said sleeve has a pair of deactivators with one being located adjacent to each of said latches.

7. A package having child-resistant, senior-friendly dispensing properties for storing and dispensing tablets, comprising:
- a blister card having a substantially flat card section and a plurality of blister compartments for holding the tablets; and
- a hollow plastic sleeve having an opposed pair of major wall panels, an opposed pair of side edges and a dispensing end;
- said sleeve providing a protective housing for said blister card when said blister card is in a storage position within said sleeve, and said blister card being slidable in a direction relative to said dispensing end of said sleeve between said storage position and a dispensing position in which said card section extends at least partially outside said sleeve to expose said blister compartments;
- said sleeve including a pair of latches that extend from at least one of said wall panels toward said blister card;
- said blister card including a pair of latch-catchers for cooperatively engaging and catching said latches when said blister card is in said storage position to automatically lock said blister card in said storage position within said sleeve when said blister card is slid to said storage position;
- said opposed pair of side edges of said sleeve including a pair of opposed resiliently-depressible tabs for unlatching said latches from said latch-catchers when said pair of opposed tabs are simultaneously depressed toward one another to permit said blister card to slide relative to said sleeve from said storage position to said dispensing position;
- said sleeve including at least one deactivator positionable between a first position in which said blister card is permitted to automatically lock to said sleeve when said blister card is slid to said storage position and a second position in which said blister card is prevented from becoming locked to said sleeve;
- said at least one deactivator including a wall panel forming a part of one of said major wall panels of said sleeve when said at least one deactivator is in said first position, and said wall panel of said at least one deactivator having one edge forming a hinge about which said wall panel of said at least one deactivator is pivotal from said first position to said second position;

in said second position, said wall panel of said at least one deactivator extending substantially perpendicular to said major wall panel to which it is connected adjacent one of said latches to a height extending above a height of said adjacent one of said latches; and
- said wall panel of said at least one deactivator including a pair of fingers which extend about said adjacent one of said latches capturing said adjacent one of said latches therebetween and forming a frictional engagement with said adjacent one of said latches to retain said at least one deactivator in said second position.

8. A package according to claim 7, wherein a support rail for supporting sliding movement of said blister card extends from said major wall panel of said sleeve on which said wall panel of said at least one deactivator is formed such that said support rail extends between said wall panel of said at least one deactivator and said adjacent one of said latches.

9. A package according to claim 7, wherein each of said latch-catchers is an aperture formed in said blister card, and wherein, when said at least one deactivator is in said second position, a combination of said at least one deactivator and said adjacent one of said latches is sufficiently large such that it cannot fit within said aperture.

10. A package according to claim 7, wherein said sleeve has a pair of deactivators with one being located adjacent to each of said latches.

11. A package according to claim 7, wherein each of said tabs has an arm with a tapered surface extending transversely within said sleeve, wherein, when each of said tabs is depressed, each of said tapered surfaces of said arms engages and flexes said card section of the said blister card such that an adjacent one of said latches is released from an adjacent one of said latch-catchers.

12. A package according to claim 7, wherein each of said latches is a structure having a tapered side facing said dispensing end so that said blister card is easy to slide into said storage position, and wherein each of said latch catchers is selected from the group consisting of an aperture, a cavity, and a notch formed in or by said blister card.

13. A package according to claim 7, wherein said card section has front, rear and opposite side margins within which said blister compartments holding the tablets do not extend, and wherein said latch-catchers are located on said rear margin and opposite ones of said side margins.

14. A package according to claim 13, wherein said sleeve is formed by a pair of molded body sections, wherein each of said body sections have a spaced-apart pair of support rails extending from said major wall panels, wherein said support rails of said body sections within said sleeve extend adjacent said side edges of said sleeve and opposed ones of said support rails define a small gap therebetween in which said side margin of said card section of said blister card is received; and wherein said support rails support said side margins of said card section to stabilize said card section of said blister card within said sleeve and to stabilize sliding movement of said blister card relative to said sleeve.

15. A package according to claim 14, wherein one of said latches is adjacent to each opposed set of said support rails, and wherein each of said latches is of a greater height than an adjacent one of said support rails.

* * * * *